US012358300B2

(12) United States Patent
Tokimatsu

(10) Patent No.: US 12,358,300 B2
(45) Date of Patent: Jul. 15, 2025

(54) IMAGE FORMING APPARATUS

(71) Applicant: Konica Minolta, Inc., Tokyo (JP)

(72) Inventor: Hiroyuki Tokimatsu, Hino (JP)

(73) Assignee: KONICA MINOLTA, INC., Tokyo (JP)

( * ) Notice: Subject to any disclaimer, the term of this patent is extended or adjusted under 35 U.S.C. 154(b) by 132 days.

(21) Appl. No.: 18/355,024

(22) Filed: Jul. 19, 2023

(65) Prior Publication Data

US 2024/0059074 A1 Feb. 22, 2024

(30) Foreign Application Priority Data

Aug. 22, 2022 (JP) ................................ 2022-132037

(51) Int. Cl.
*B41J 2/175* (2006.01)
*B41J 2/045* (2006.01)
*B41J 2/165* (2006.01)

(52) U.S. Cl.
CPC ......... *B41J 2/17596* (2013.01); *B41J 2/0451* (2013.01); *B41J 2/16579* (2013.01)

(58) Field of Classification Search
CPC ........ B41J 2/17593; B41J 2/195; B41J 2/175; B41J 2/0451; B41J 2/16579; B41J 2/17596; B41J 2/18; B41J 2/17503
See application file for complete search history.

(56) References Cited

U.S. PATENT DOCUMENTS

2022/0063287 A1 3/2022 Venkataramanan et al.

FOREIGN PATENT DOCUMENTS

JP 2006-281454 A 10/2006
JP 2012-000883 A 1/2012

OTHER PUBLICATIONS

European Patent Office, "Extended European Search Report" dated Feb. 5, 2024 which was issued in connection with the corresponding European patent application No. 23191845.9,9 pages.

*Primary Examiner* — An H Do
(74) *Attorney, Agent, or Firm* — LUCAS & MERCANTI, LLP

(57) ABSTRACT

An image forming apparatus includes: a main tank that stores ink; an ink head unit that includes a first heating device to heat the ink and that ejects the heated ink; a supply channel that supplies the ink from the main tank to the ink head unit; and a second heating device that heats the supply channel. The second heating device starts heating at a predetermined timing such that a temperature of a specific region in the supply channel becomes equal to or more than a second temperature that is a melting point of a component having a highest melting point.

7 Claims, 8 Drawing Sheets

IMAGE FORMING APPARATUS

The entire disclosure of Japanese patent Application No. 2022-132037, filed on Aug. 22, 2022, is incorporated herein by reference in its entirety.

BACKGROUND

Technological Field

The present disclosure relates to an image forming apparatus.

DESCRIPTION OF THE RELATED ART

Japanese Laid-Open Patent Publication No. 2006-281454, and Japanese Laid-Open Patent Publication No. 2012-000883, each disclose an image forming apparatus for forming an image on a recording medium by ejecting heated ink onto the recording medium from an ink head.

SUMMARY

The ink heated for use may contain a plurality of components having melting points different from each other. In such a case, when the ink stays for a long time in a channel connecting a main tank for storing the ink and an ink head device having a heating device, a melted component and a non-melted component may be separated from each other, with the result that the ink components may become non-uniform or the separated non-melted component may be accumulated in an ink channel.

One object of the present disclosure is to provide an image forming apparatus that uses ink containing a plurality of components having melting points different from each other and that heats and ejects the ink, wherein non-uniformity of the ink components in a channel connecting a main tank storing the ink and an ink head device having a heating device is suppressed.

To achieve at least one of the abovementioned objects, according to an aspect of the present invention, an image forming apparatus reflecting one aspect of the present invention comprises: a main tank that stores ink containing a plurality of types of components having melting points different from each other; an ink head unit that includes a first heating device to heat the ink and that ejects the heated ink; a supply channel that supplies the ink from the main tank to the ink head unit; a second heating device that heats the supply channel; and a controller. The supply channel includes a specific region having a temperature equal to or more than a first temperature and less than a second temperature when the first heating device is heating the ink and the second heating device is not heating the supply channel, the first temperature being a melting point of a component having a lowest melting point in the plurality of types of components, the second temperature being a melting point of a component having a highest melting point in the plurality of types of components. The controller causes the second heating device to start heating at a predetermined timing such that the temperature of the specific region is equal to or more than the second temperature.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Figure 1:
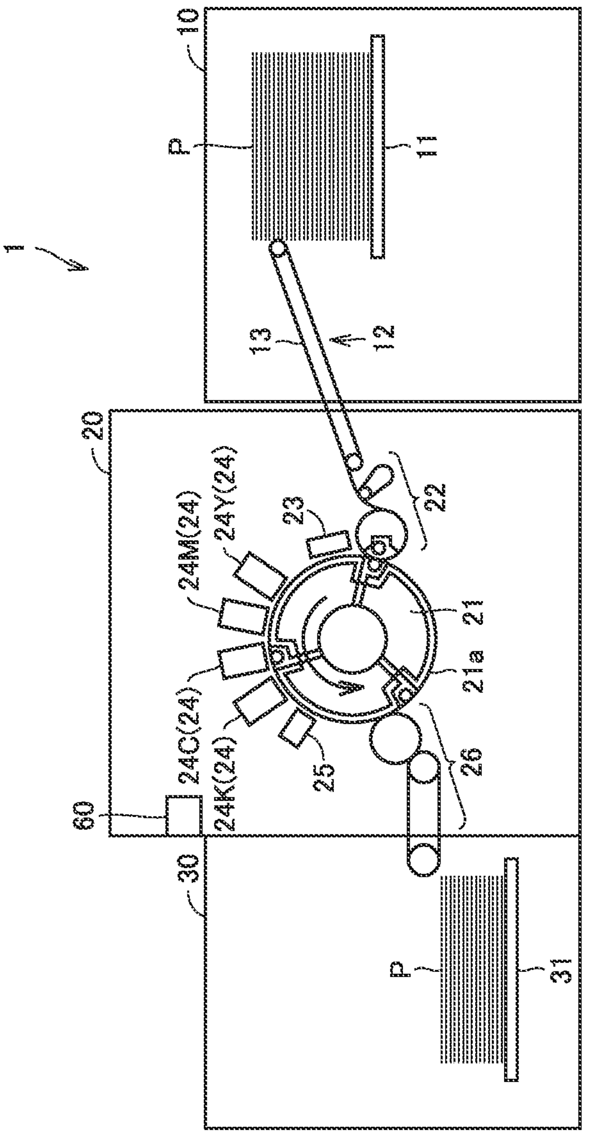
FIG. 1 is a diagram illustrating an image forming apparatus.

Hereinafter, one or more embodiments of the present invention will be described with reference to the drawings. However, the scope of the invention is not limited to the disclosed embodiments.

In the following description, the same parts and constituent elements are denoted by the same reference numerals. Their names and functions are also the same. Therefore, detailed description thereof will not be repeated. Note that the embodiments and modification examples described below may be selectively combined as appropriate.

<Overview of Image Forming Apparatus>

An overview of an image forming apparatus will be described with reference to FIG. 1. FIG. 1 is a diagram illustrating the image forming apparatus. With reference to FIG. 1, the image forming apparatus 1 is an inkjet printer that ejects ink to form an image on a recording medium P. The image forming apparatus 1 may be a monochrome inkjet printer or a color inkjet printer. In one example, image forming apparatus 1 according to the present embodiment is a color inkjet printer that ejects the following four colors of ink: yellow, magenta, cyan, and black.

The ink is liquid-based ink. In the image forming apparatus 1 according to the present embodiment, gel ink is used for image formation. The gel ink contains a gelling agent. The gel ink has such a property that it changes to a gel state or a sol state depending on temperature and is cured when being irradiated with energy rays such as ultraviolet rays. The ink used in the image forming apparatus 1 according to the present embodiment contains a plurality of types of waxes having melting points different from each other.

The image forming apparatus 1 includes a sheet feed section 10, an image forming section 20, a sheet ejection section 30, and a controller 60. In the image forming apparatus 1, the recording medium P accommodated in the sheet feed section 10 is conveyed to the image forming section 20, and an image is formed on the recording medium P by the image forming section 20. The recording medium P, on which the image has been formed, is conveyed to the sheet ejection section 30. As the recording medium P, for example, various media can be used on each of which the ink ejected onto the surface can be solidified, such as a sheet of paper or a sheet-like resin.

The sheet feed section 10 conveys the recording medium P to the image forming section 20. The sheet feed section 10 includes a sheet feed tray 11 in which the recording medium P is placed, and a supply section 12 that supplies the recording medium P from the sheet feed tray 11 to the image forming section 20. The supply section 12 includes a ring-shaped belt 13 supported by two rollers. Rotation of a roller with the recording medium P placed on the belt 13 conveys the recording medium P from the sheet feed tray 11 to the image forming section 20.

The image forming section 20 forms an image on the recording medium P. The image forming section 20 includes a conveyance drum 21, a first handover unit 22, a sheet heating section 23, an ink head unit 24, a fixing section 25, and a second handover unit 26.

The conveyance drum 21 is a member that conveys the recording medium P. The conveyance drum 21 has a cylindrical shape. The conveyance drum 21 is rotated around a rotational axis extending in a direction perpendicular to a paper plane of FIG. 1 in a state where the recording medium P is held on a conveyance surface 21*a* which is an outer peripheral surface of the conveyance drum 21, thereby conveying the recording medium P in a conveyance direction along a conveyance surface 21*a*. The conveyance drum 21 is connected to a motor that rotates the conveyance drum 21, and is rotated by an angle proportional to a rotation amount of the motor.

The first handover unit 22 is a unit that receives the recording medium P conveyed from the sheet feed section 10 and that sends the recording medium P to the conveyance drum 21. The first handover unit 22 is provided between the supply section 12 and the conveyance drum 21.

The sheet heating section 23 is a mechanism that heats the recording medium P. The sheet heating section 23 is provided between the first handover unit 22 and the ink head unit 24. The sheet heating section 23 heats the recording medium P so that the temperature of the recording medium P falls within a predetermined range.

The ink head unit 24 is a unit that ejects ink onto the recording medium P to form an image. The ink head unit 24 includes an ink head that ejects the ink. The ink head unit 24 is disposed such that a surface of the ink head from which ink is ejected faces the conveyance surface 21*a*. The ink head unit 24 forms the image on the recording medium P by ejecting the ink onto the recording medium P at an appropriate timing in accordance with the rotation of the conveyance drum 21 on which the recording medium P is held.

The ink head unit 24 is provided for each color of ink. In the present embodiment, an ink head unit 24Y that ejects yellow ink, an ink head unit 24M that ejects magenta ink, an ink head unit 24C that ejects cyan ink, and an ink head unit 24K that ejects black ink are disposed in this order from the upstream side of the conveyance path for recording medium P.

In the following description, when the ink head unit 24Y, the ink head unit 24M, the ink head unit 24C, and the ink head unit 24K are not distinguished from each other, they are referred to as "ink head units 24".

The fixing section 25 cures the ink on the recording medium P and fixes the ink to the recording medium P by irradiating the recording medium P placed on the conveyance drum 21 with energy rays such as ultraviolet rays.

The second handover unit 26 is a unit that receives the recording medium P conveyed by the conveyance drum 21 and that conveys the recording medium P to the sheet ejection section 30.

The sheet ejection section 30 includes a plate-like sheet ejection tray 31 on which the recording medium P having the image formed thereon and conveyed from the image forming section 20 is to be placed.

<Hardware Configuration Example of Image Forming Apparatus 1>

Figure 2:
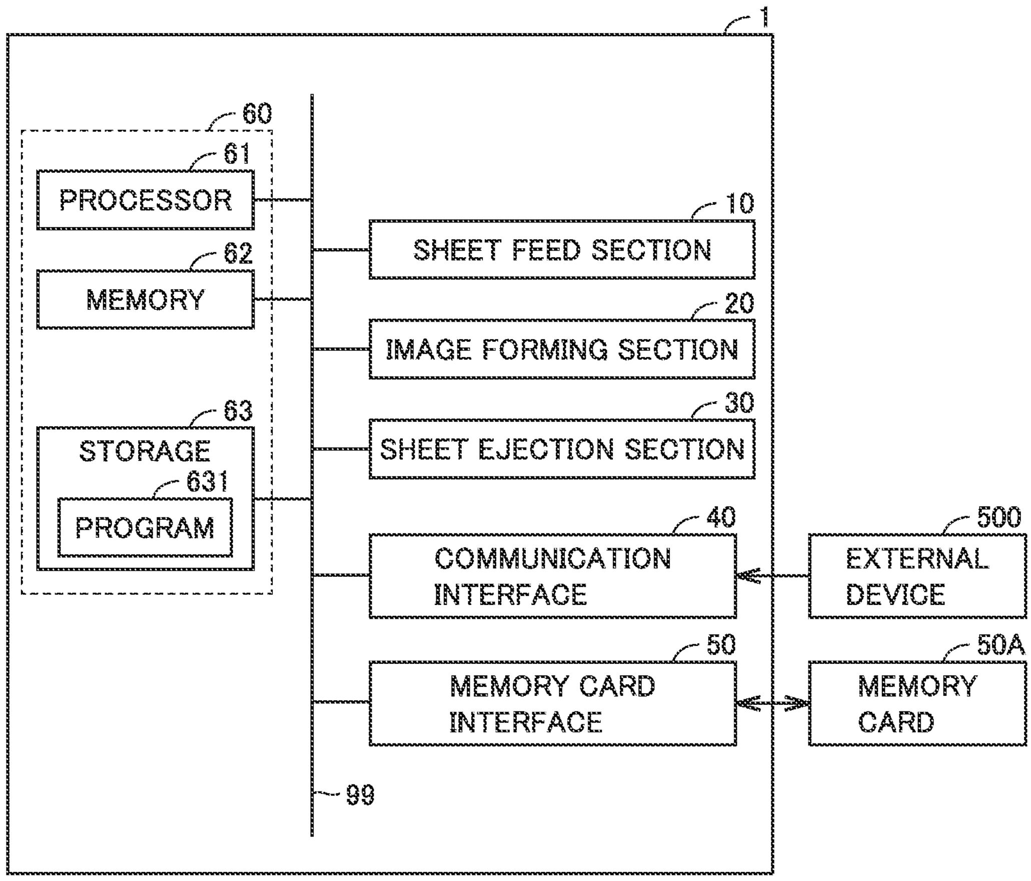
FIG. 2 is a diagram illustrating an example of a hardware configuration of the image forming apparatus.

A hardware configuration of the image forming apparatus 1 will be described with reference to FIG. 2. FIG. 2 is a diagram illustrating an example of the hardware configuration of the image forming apparatus. The image forming apparatus 1 includes a communication interface 40 and a memory card interface 50 in addition to the sheet feed section 10, the image forming section 20, the sheet ejection section 30, and the controller 60 illustrated in FIG. 1. The sheet feed section 10, the image forming section 20, the sheet ejection section 30, the communication interface 40, the memory card interface 50, and the controller 60 are electrically connected to each other via a bus 99.

The communication interface 40 performs transmission and reception of data between the image forming apparatus 1 and an external device 500. The external device 500 is, for example, a terminal apparatus used by a user. As an example, the communication interface 40 receives image data to be printed, from the external device 500.

The controller 60 includes a processor 61, a memory 62, and a storage 63. The processor 61 includes, for example, a central processing unit (CPU), a micro-processing unit (MPU), or the like. The memory 62 is constituted of a volatile storage device such as a dynamic random access memory (DRAM) or a static random access memory (SRAM). The storage 63 is constituted of a nonvolatile storage such as a solid state drive (SSD) or a flash memory, for example. The storage 63 stores a program 631. The program 631 includes computer-readable instructions for controlling the image forming apparatus 1. The processor 61 implements various types of processing according to the present embodiment by loading a program 631 stored in the storage 63 into the memory 62 and executing it.

The program 631 is provided with the program 631 being stored in a storage medium such as a memory card 50A. The program 631 is read from the memory card 50A by the memory card interface 50 and installed in the image forming apparatus 1.

The program 631 may be provided to be incorporated in a part of an arbitrary program, rather than a single program. In this case, the processing according to the present embodiment is realized in cooperation with the arbitrary program. Such a program that does not include part of modules does not depart from the gist of the image forming apparatus 1 according to the present embodiment. Part or whole of the functions provided by the program 631 may be realized by dedicated hardware.

Instead of installing the program 631 stored in the memory card 50A into the image forming apparatus 1, a program downloaded from a distribution server or the like may be installed into the image forming apparatus 1.

<Configuration of Ink Head Unit 24 of Image Forming Apparatus 1>

Figure 3:
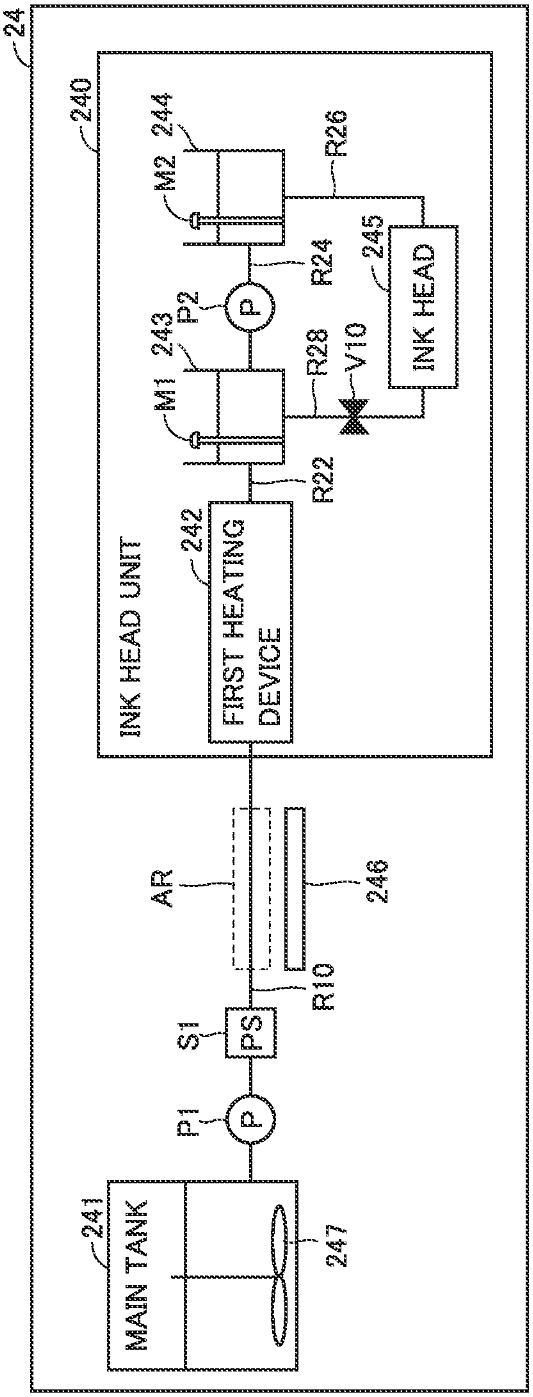
FIG. 3 is a diagram illustrating a configuration of an ink head unit.

Referring to FIG. 3, the ink head unit 24 will be described. FIG. 3 is a diagram illustrating a configuration of the ink head unit.

With reference to FIG. 3, the ink head unit 24 includes an ink head unit 240, a main tank 241, and a supply channel R10. The supply channel R10 is a channel through which the ink flows to supply the ink from the main tank 241 to the ink head unit 240.

The main tank 241 stores the ink containing a plurality of types of components having melting points different from each other. The main tank 241 includes a stirring device 247.

In the present embodiment, the ink in the main tank 241 is stored without being heated. Therefore, when the ink is stored in the main tank 241 for a long time without being stirred, the ink components may be separated and liberated in a non-uniform distribution. The stirring device 247 is controlled by the controller 60 to stir the ink in the main tank 241 at a predetermined timing to uniformly distribute the ink components.

In the supply channel R10, a first supply pump P1, a pressure sensor S1, and a second heating device 246 are provided in this order from the main tank 241 side. The first supply pump P1 is controlled by the controller 60 to send the ink in the main tank 241 to the ink head unit 240 in response to the driving thereof. The pressure sensor S1 detects the pressure of the ink in the supply channel R10. The second heating device 246 will be described later.

The ink head unit 240 includes a first heating device 242, a first storage tank 243, a second storage tank 244, and an ink head 245. The ink head unit 240 further includes a second supply pump P2 provided at a channel R24 connecting the first storage tank 243 and the second storage tank 244. A channel R28 connecting the first storage tank 243 and the ink head 245 is provided with a discharge valve V10.

The first heating device 242 brings the ink supplied from the main tank 241 into a sol state by heating the ink. More specifically, the first heating device 242 heats the ink supplied from the main tank 241 to have a temperature more than a second temperature that is the melting point of a component having a highest melting point in the plurality of types of components contained in the ink. The first heating device 242 is, in one example, a rubber heater.

The ink heated by the first heating device 242 is sent to the first storage tank 243 via the channel R22 in response to the driving of the first supply pump P1. The first storage tank 243 stores the heated ink. The first storage tank 243 may have a heating device, and may store the ink at a temperature more than the above-described second temperature by heating the stored ink by the heating device.

The first storage tank 243 includes a first sensor M1. The first sensor M1 detects an amount of the ink in the first storage tank 243. The first sensor M1 may be a liquid level sensor that measures the height of the liquid level of the ink in the first storage tank 243 or may be a weight sensor that measures the weight of the ink in the first storage tank 243. The first sensor M1 outputs the detection result to the controller 60.

When the amount of the ink in the first storage tank 243 becomes smaller than a first reference value based on the detection result from the first sensor M1, the controller 60 drives the first supply pump P1 to send the ink from the main tank 241 to the first storage tank 243. For example, the controller 60 drives the first supply pump P1 to send the ink from the main tank 241 to the first storage tank 243 until the liquid amount of the ink in the first storage tank 243 reaches a threshold value A. The threshold value A is a value indicating the full capacity of the first storage tank 243.

The second supply pump P2 is controlled by the controller 60 to send the ink in the first storage tank 243 to the second storage tank 244 in response to the driving. The second storage tank 244 stores the ink sent from the first storage tank 243. It should be noted that the second storage tank 244 may have a heating device, and the stored ink may be stored at a temperature more than the above-described second temperature by heating the stored ink by the heating device.

The second storage tank 244 includes a second sensor M2. The second sensor M2 detects a liquid amount of the ink in the second storage tank 244. The second sensor M2 may be a liquid level sensor that measures the height of the liquid level of the ink in the second storage tank 244, or may be a weight sensor that measures the weight of the ink in the second storage tank 244. The second sensor M2 outputs the detection result to the controller 60.

When the liquid amount of the ink in the second storage tank 244 becomes less than a second reference value based on the detection result of the second sensor M2, the controller 60 drives the second supply pump P2 to send the ink from the first storage tank 243 to the second storage tank 244. For example, the controller 60 drives the second supply pump P2 to send the ink from the first storage tank 243 to the second storage tank 244 until the liquid amount of the ink in the second storage tank 244 reaches a threshold value B. The threshold value B is a value indicating the full capacity of the second storage tank 244.

Further, as described below, when the ink in the first storage tank 243 exceeds the threshold value C at the time of performing the heating by the second heating device 246, the controller 60 drives the second supply pump P2 to send the ink from the first storage tank 243 to the second storage tank 244. To be more specific, the controller 60 drives the second supply pump P2 to send the ink from the first storage tank 243 to the second storage tank 244 until the amount of the ink in the second storage tank 244 becomes less than the threshold value C. The threshold value C is set to be less than the above-described threshold value A.

The ink head 245 forms an image on the recording medium P by ejecting the ink sent from the second storage tank 244 through the channel R26, based on an instruction from the controller 60.

The first storage tank 243 and the ink head 245 are connected to each other through the channel R28, and the discharge valve V10 is provided in the channel R28. The opening and closing of the discharge valve V10 are controlled by the controller 60. The discharge valve V10 is controlled to be in an open state when an air bubble enters the ink head 245, and is controlled to be in a closed state in other cases. By opening the discharge valve V10, the ink flows from the second storage tank 244 to the first storage tank 243 via the ink head 245, and the air bubble having entered the ink head 245 can be removed.

The ink head unit 24 includes the second heating device 246 that heats the supply channel R10. The second heating device 246 temporarily heats the supply channel R10. The second heating device 246 is, in one example, a rubber heater.

In the present embodiment, the main tank 241 stores the ink without being heated. The main tank 241 and the surroundings of the main tank 241 are highly likely to be touched by the user because the main tank 241 may be refilled with ink by the user. Therefore, the temperature of the main tank 241 and the temperature in the surroundings of the main tank 241 cannot be increased as high as the temperature inside the ink head unit 240.

The ink head unit 24 may have a function of temporarily increasing the temperature of the ink in the main tank 241. However, even in this case, the temperature of the ink in the main tank 241 is not increased to the temperature at which the ink transitions to the sol state, in consideration of the possibility that the user touches it.

Therefore, the supply channel R10 connects the ink head unit 240 in which the ink is heated and the main tank 241 in which the ink at a low temperature is stored. As a result, due to heat transfer from the ink head unit 240, the temperature of at least a part of a region of the supply channel R10 falls within a temperature range in which the melting point of part of the components in the ink is reached but the melting point of part of the components therein is not reached.

Hereinafter, the temperature range is also referred to as a “separation temperature range”. In addition, when the first heating device 242 heats the ink and the heating by the second heating device 246 is stopped, a region in the supply channel R10 having a temperature within the separation temperature range is also referred to as a “specific region AR”.

In the present embodiment, the ink used herein contains the plurality of types of components having melting points different from each other. The plurality of types of components are waxes, and function as a gelling agent. Two or more types of waxes are contained in the ink.

Figure 4:
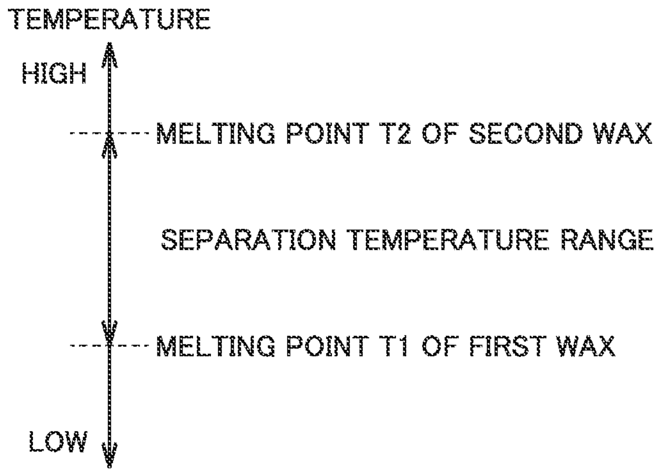
FIG. 4 is a diagram illustrating a separation temperature range.

FIG. 4 is a diagram illustrating the separation temperature range. As illustrated in FIG. 4, the separation temperature range is equal to or more than a first temperature T1 and less than a second temperature T2, the first temperature T1 being the melting point of a first wax having the lowest melting point in the plurality of waxes included in the ink, the second temperature T2 being the melting point of the second wax having the highest melting point in the plurality of waxes.

In general, when the ink stays for a long time in the specific region AR having a temperature within the separation temperature range, a wax component having a low melting point in the ink starts to be melted and is facilitated to flow. On the other hand, a wax component having a high melting point in the ink is separated and accumulated in the supply channel R10. As a result, the ink components becomes non-uniform in the specific region AR. When the ink components become non-uniform, the ink channel or the ink head 245 may be clogged and the image forming apparatus 1 may fail. In addition, when the ink components become non-uniform, there is a possibility that the image quality of the printed material is deteriorated.

In the present embodiment, the controller 60 causes the second heating device 246 to start heating at a predetermined timing so that the temperature of the specific region AR becomes equal to or more than the second temperature T2. As a result, the wax having a high melting point and staying or accumulated in the specific region AR is melted, and thus the wax is facilitated to flow in the supply channel R10, thereby eliminating the non-uniformity of the ink components and the clogging by the wax.

The second heating device 246 may be a device that heats the entire specific region AR or may be a device that heats a part of the specific region AR as long as the temperature of the specific region AR can be equal to or more than the second temperature T2. In addition, the second heating device 246 is not limited to the configuration in which the specific region AR is directly heated as long as the temperature of the specific region AR can be equal to or more than the second temperature T2 by heating the supply channel R10. For example, the second heating device 246 may heat a region outside the specific region AR.

<Sequence of Processing Executed in Image Forming Apparatus>

Figure 5:
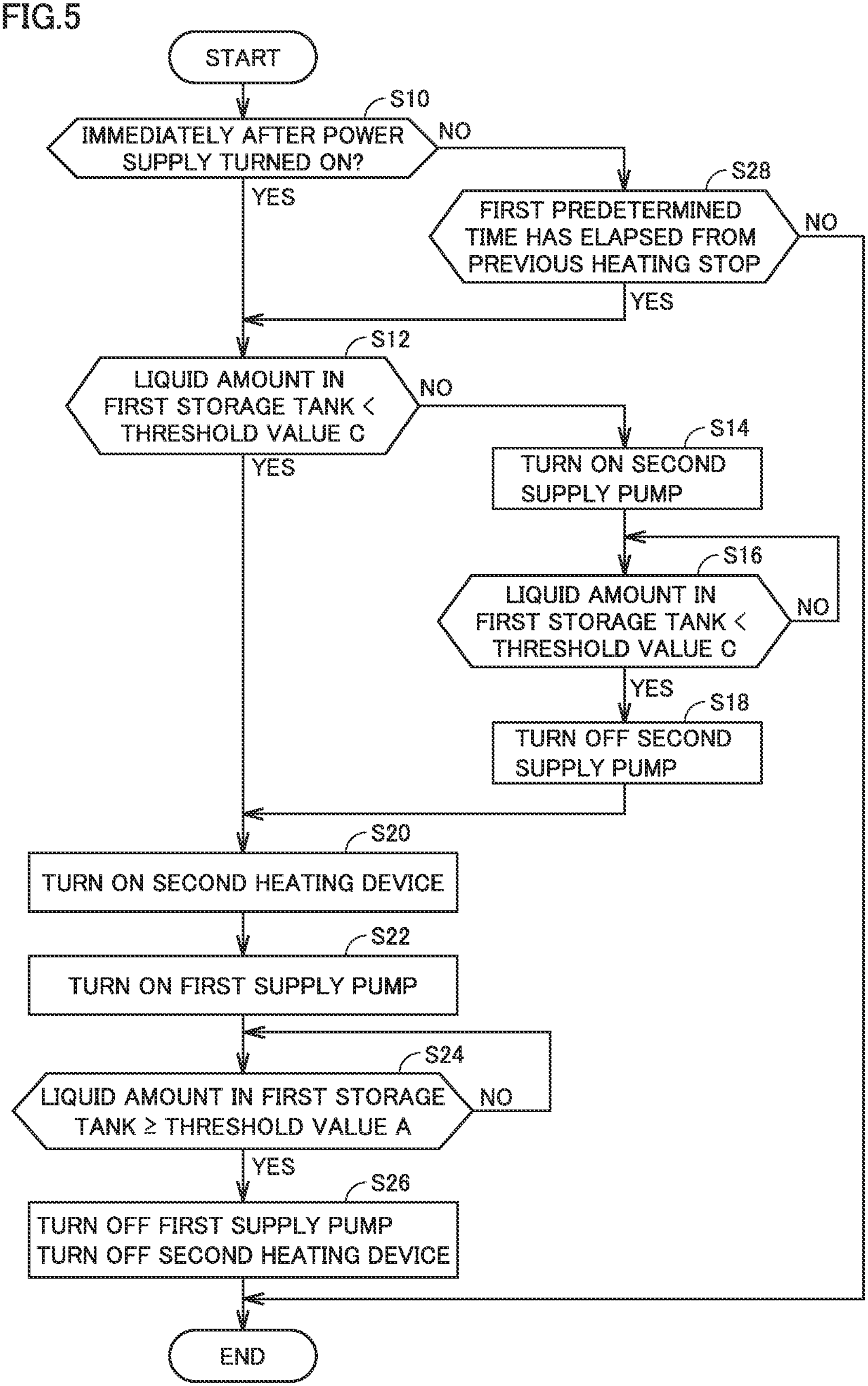
FIG. 5 is a flowchart showing a sequence of processing executed in the image forming apparatus.

FIG. 5 is a flowchart showing a sequence of processing executed in the image forming apparatus. The processing illustrated in FIG. 4 is executed by the processor 61 described above. Hereinafter, step is abbreviated as “S”.

With reference to FIG. 5, a heating start timing by the second heating device 246 and processing at the time of heating by the second heating device 246 will be described. The processor 61 executes the processing illustrated in FIG. 5 at a predetermined cycle.

In S10, the processor 61 determines whether or not it is immediately after a power supply of the image forming apparatus 1 is turned on. When it is immediately after the power supply of the image forming apparatus 1 is turned on (YES in S10), the processor 61 proceeds the processing to S12. The turning-on and off of the power supply are switched by pressing a power supply button (not illustrated).

In S12, the processor 61 determines whether or not the liquid amount of the ink in the first storage tank 243 is less than the threshold value C based on the detection result of the first sensor M1. When the liquid amount is less than the threshold value C (YES in S12), the processor 61 proceeds the processing to S20. When the liquid amount is not less than the threshold value C, in other words, when the liquid amount is equal to or more than the threshold value C (NO in S12), the processor 61 proceeds the processing to S14.

In S14, the processor 61 drives the second supply pump P2. Accordingly, the ink in the first storage tank 243 is sent to the second storage tank 244, and the liquid amount of the ink in the first storage tank 243 is decreased. Note that at this time, the first supply pump P1 is not driven.

In S16, the processor 61 determines whether or not the liquid amount of the ink in the first storage tank 243 is less than the threshold value C based on the detection result of the first sensor M1. When the liquid amount is less than the threshold value C (YES in S16), the processor 61 proceeds the processing to S18.

In S18, the processor 61 stops the driving of the second supply pump P2. In other words, from S14 to S18, the processor 61 controls the second supply pump P2 to send the ink in the first storage tank 243 to the second storage tank 244 until the liquid amount of the ink in the first storage tank 243 becomes less than the threshold value C.

In S20, the processor 61 causes the second heating device 246 to start heating. In other words, from S12 to S18, the processor 61 sets the liquid amount of the ink in the first storage tank 243 to be less than the threshold value C when the heating by the second heating device 246 is started.

In S22, the processor 61 drives the first supply pump P1. Thus, ink flows in the specific region AR. The timing at which the driving of the first feed pump P1 is started may be at or after the start of heating by the second heating device 246, may be at the same time as the start of heating by the second heating device 246, or may be after the start of heating by the second heating device 246.

In S24, it is determined whether or not the liquid amount of the ink in the first storage tank 243 is equal to or more than the threshold value A based on the detection result of the first sensor M1. When the liquid amount is equal to or more than the threshold value A (YES in S24), the processor 61 proceeds the processing to S26. As described above, the threshold value A is a value indicating the full capacity of the first storage tank 243.

In S26, the processor 61 stops the driving of the first feed pump P1, stops the heating by the second heating device 246, and ends the processing. In other words, from S22 to S26, the processor 61 causes the ink to flow into the specific region AR until the liquid amount of the ink in the first storage tank 243 reaches the threshold value A. The timing at which the driving of the first supply pump P1 is stopped and the timing at which the heating by the second heating device 246 is stopped are not limited thereto.

Returning to S10, when it is not immediately after the power supply of the image forming apparatus 1 is turned on (NO in S10), the processor 61 proceeds the processing to S28.

In S28, the processor 61 determines whether or not a first predetermined time has elapsed from the previous heating stop. The previous heating stop means that the heating by the second heating device 246 is stopped in S26. When the first predetermined period has elapsed from the previous heating stop (YES in S28), the processor 61 proceeds to the above-described S12, sets the liquid amount of the ink in the first storage tank 243 to be less than the threshold value C, and then causes the second heating device 246 to start heating again in S20. When the first predetermined period has not elapsed from the previous heating stop (NO in S28), the processor 61 ends the processing.

In other words, the processor 61 causes the second heating device 246 to start the heating when the heating by the second heating device 246 has been stopped for the first predetermined time or more. The first predetermined time is determined based on a time until the wax having a high melting point in the ink in the specific region AR starts to be separated.

As described above, the processor 61 causes the second heating device 246 to start heating in response to the power supply of the image forming apparatus 1 being turned on or the first predetermined time or more having elapsed from the heating stop by the second heating device 246. The processor 61 may cause the second heating device 246 to start heating only when the power supply of the image forming apparatus 1 is turned on or only when the first predetermined time or more has elapsed from the heating stop.

In addition, the processor 61 drives the first supply pump P1 at or after the start of the heating of the second heating device 246. Accordingly, the ink flows into the specific area AR, and the wax in the specific area AR as heated and melted by the second heating device 246 can flow.

<Heating Start Timing by Second Heating Device>

Figure 6:
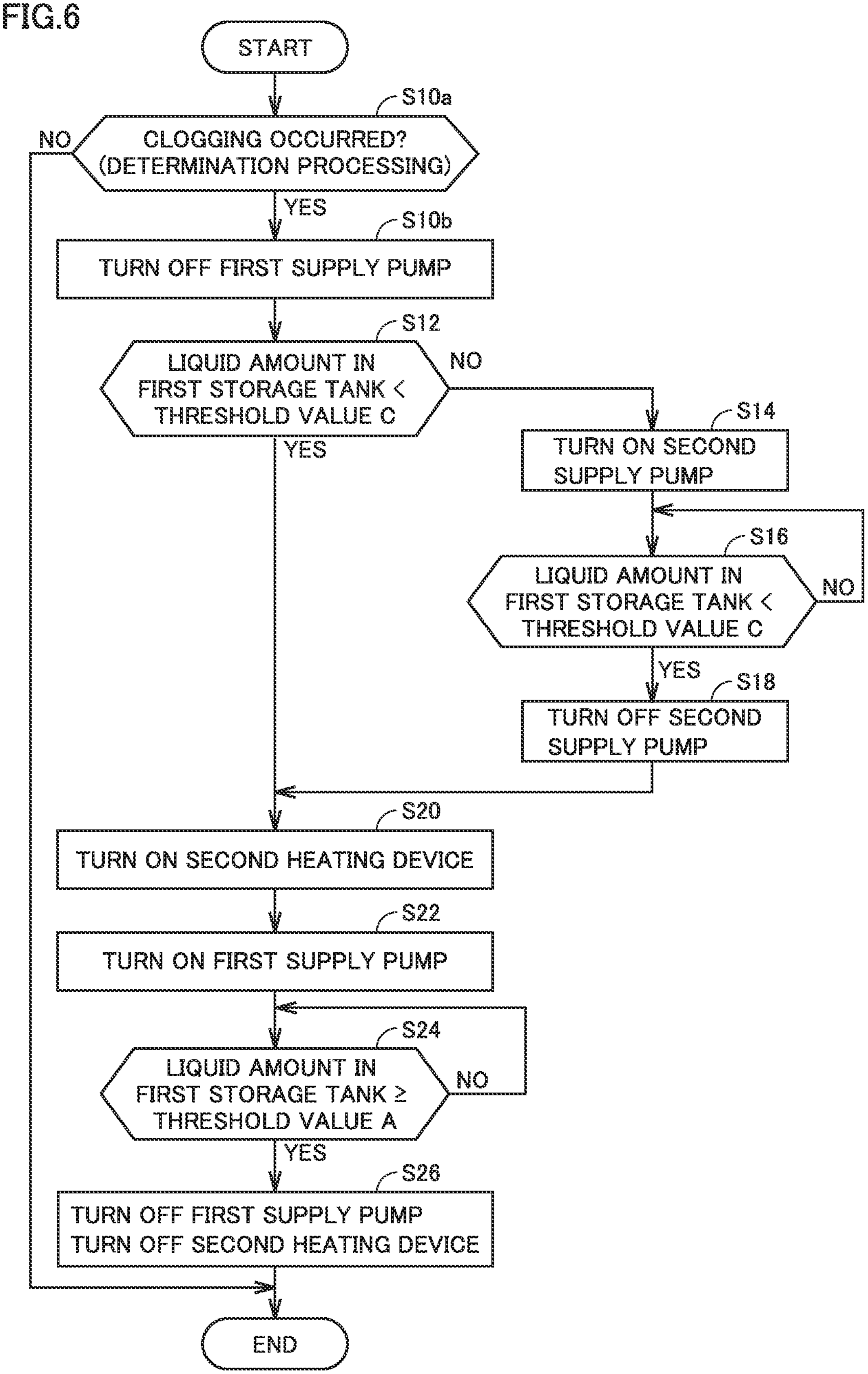
FIG. 6 is a flowchart illustrating a sequence of processing executed in an image forming apparatus according to a modification example.
Figure 7:
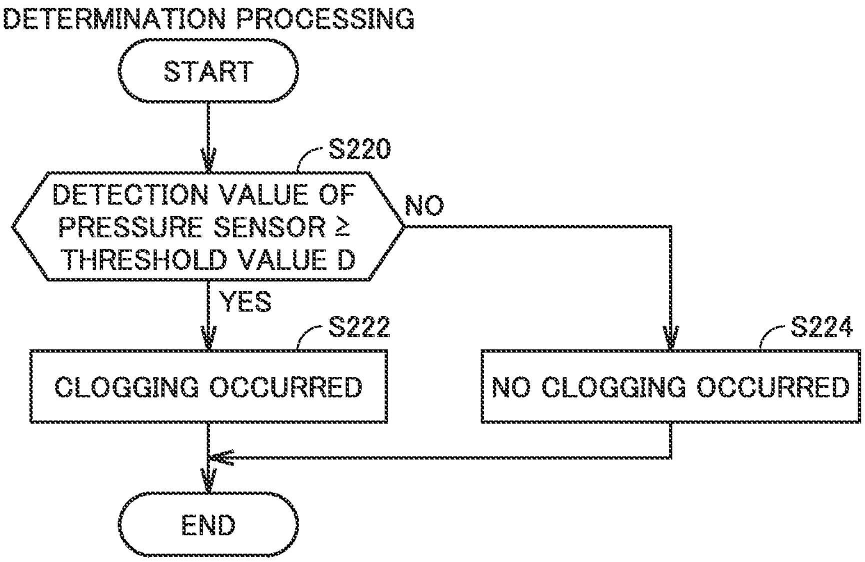
FIG. 7 is a flowchart illustrating a sequence of determination processing.

The processor 61 may cause the second heating device 246 to start the heating when clogging of the ink has occurred. Specifically, description will be given with reference to FIGS. 6 and 7. FIG. 6 is a flowchart illustrating a sequence of processing executed in an image forming apparatus according to a modification example. FIG. 7 is a flowchart illustrating a sequence of determination processing. Note that the processing illustrated in FIG. 6 is performed at a predetermined cycle during driving of the first supply pump P1.

In S10*a*, the processor 61 performs the determination processing to determine whether or not clogging has occurred. When the clogging has occurred (YES in S10*a*), the processor 61 proceeds the processing to S10*b*. When no clogging has occurred (NO in S10*a*), the processor 61 ends the processing.

In S10*b*, the processor 61 stops the driving of the first supply pump P1, proceeds the processing to S12, makes the liquid amount of the ink in the first storage tank 243 less than the threshold value C, and then cause the second heating device 246 to start heating. Note that since the processing of S12 and after S12 is the same as the processing sequence described with reference to FIG. 4, description thereof will not be repeated.

Next, the determination processing performed by the processor 61 in S10*a* will be described with reference to FIG. 7.

In S220, the processor 61 determines whether or not the detection value of the pressure sensor S1 is more than or equal to the threshold value D.

When the detection value of the force sensor S1 is more than or equal to the threshold value D (YES in S220), the processor 61 proceeds the processing to S222, determines that clogging has occurred, and ends the determination processing.

On the other hand, when the detection value of the force sensor in S1 is not equal to or more than the threshold value D, in other words, when the detection value is less than the threshold value D (NO in S220), the processor 61 proceeds the processing to S224, determines that no clogging has occurred, and ends the determination processing.

When the determination processing is ended, the processor 61 returns to S10*a* of FIG. 6, proceeds the processing to S10*b* when it is determined that the clogging has occurred, and ends the processing when it is determined that no clogging has occurred.

The pressure sensor S1 is provided in the supply channel R10 connecting the main tank 241 and the ink head unit 240. More specifically, the pressure sensor S1 is provided in the supply channel R10 between the first supply pump P1 and the specific region AR in which the second heating device 246 is provided. When clogging has occurred on the specific area AR side at the downstream with respect to the pressure sensor S1, the pressure of the ink in the supply channel R10 in which the pressure sensor S1 is provided is increased. Therefore, by monitoring the pressure of the ink in the supply channel R10 using the pressure sensor S1, the controller 60 can determine whether or not clogging has occurred on the downstream side with respect to the position where the pressure sensor S1 is provided. Note that the pressure sensor S1 may be provided in the specific region AR, and may be provided on the upstream side (the main tank 241 side) with respect to the position where clogging of the ink is likely to occur.

Figure 8:
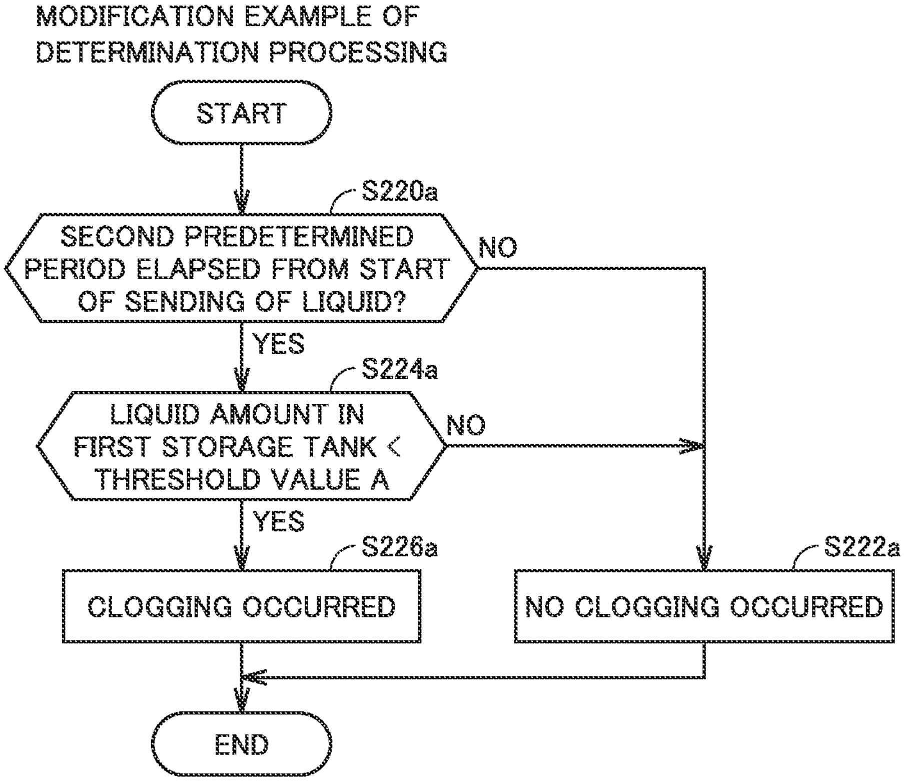
FIG. 8 is a flowchart illustrating a sequence of a determination processing according to a modification example.

Note that the method of determining clogging is not limited to the method using the pressure sensor S1. FIG. 8 is a flowchart illustrating a sequence of determination processing according to a modification example. The processing illustrated in FIG. 8 is executed by the aforementioned processor 61 when the processing of S10*a* of FIG. 6 is performed.

In S220*a*, the processor 61 determines whether or not the second predetermined period has elapsed after the first supply pump P1 is driven. When the second predetermined period has not elapsed (NO in S220*a*), the processor 61 proceeds the processing to S222*a*, determines that no clogging has occurred, and ends the determination processing.

On the other hand, when the second predetermined period has elapsed (YES in S220*a*), the processor 61 proceeds the processing to S224*a*.

In S224*a*, the processor 61 determines whether or not the liquid amount in the first storage tank 243 is less than the threshold value A. When it is determined that the liquid amount is not less than the threshold value A, in other words, when it is determined that the liquid amount is equal to or more than the threshold value A (NO in S224*a*), the processor 61 proceeds the processing to S222*a*, determines that no clogging has occurred, and ends the determination processing.

On the other hand, when it is determined that the liquid amount is less than the threshold value A (YES in S224*a*), the processor 61 proceeds the processing to S226*a*, determines that clogging has occurred, and ends the determination processing.

When the determination processing is ended, the processor 61 returns to S10*a* of FIG. 6, proceeds the processing to S10*b* when it is determined that clogging has occurred, and ends the processing when it is determined that no clogging has occurred.

The second predetermined time is determined based on a period of time from when the driving of the first feed pump P1 is started to when the amount of the ink in the first storage tank 243 reaches the threshold value A in the case where the supply channel R10 is not clogged with the ink. As described above, the processor 61 drives the first supply pump P1 when the amount of the ink in the first storage tank 243 becomes smaller than the first reference value based on the detection result of the first sensor M1. The second predetermined time is set to be more than the time required for the liquid amount of the ink in the first storage tank 243 to reach the threshold value A indicating the full capacity from the first reference value when the first supply pump P1 is driven in a state where the supply channel R10 is not clogged with the ink. Therefore, when the liquid amount in the first storage tank 243 has not reached the threshold value A even though the driving time of the first supply pump P1 has elapsed the second predetermined time, it is expected that the inside of the supply channel R10 is clogged with the ink, and the processor 61 determines that clogging of the ink has occurred.

As described above, the clogging of the ink is detected by the determination processing, and the elimination processing is performed when the clogging of the ink has occurred, thereby eliminating the clogging of the ink at an early stage and preventing a failure in advance.

<Processing at the Time of Heating by Second Heating Device>

The processing at the time of heating by the second heating device 246 described above is an example, and the processor 61 may control various pumps or the like so as to cause the ink to flow into the specific region AR at the time of heating. For example, the processor 61 may cause the second heating device 246 to start the heating without causing the liquid amount of the ink in the first storage tank 243 to be less than the threshold value C. In this case, when the first supply pump P1 is driven, the processor 61 may also drive the second supply pump P2 to prevent the ink in the first storage tank 243 from overflowing. In this case, a condition for stopping the driving of the first feed pump P1 and a condition for stopping the heating by the second heating device 246 are preferably set to conditions different from the above-described conditions.

In addition, in this case, the processor 61 may prevent the ink in the first storage tank 243 from overflowing by driving the second supply pump P2 when the liquid amount of the ink in the first storage tank 243 reaches the threshold value A regardless of the timing of driving the first supply pump P1. In this case, a condition for stopping the driving of the first feed pump P1 and a condition for stopping the heating by the second heating device 246 are preferably set to conditions different from the above-described conditions.

That is, the method is not limited to the above-described method as long as the ink in the first storage tank 243 does not overflow when the ink is caused to flow in the specific region AR by driving the first supply pump P1 after the heating by the second heating device 246 is started.

As described above, the timing at which the driving of the first feed pump P1 is started may be at or after the start of the heating by the second heating device 246. For example, the processor 61 may start driving the first supply pump P2 after the start of heating by the second heating device 246 and before the temperature of the specific area AR reaches the second temperature T2 illustrated in FIG. 4. Since another wax having a melting temperature within the separation temperature range may start to be melted even before the temperature of the specific area AR reaches the second temperature T2, the non-uniformity of the ink components and the clogging of the ink can be eliminated by starting the driving of the first supply pump P1 after the heating by the second heating device 246 is started.

In this way, by starting the driving of the first feed pump P1 before the temperature of the specific region AR reaches the second temperature T2, it is possible to shorten the time required for maintenance processing as compared with a case where the first feed pump P1 is driven after the temperature of the specific region AR reaches the second temperature T2. Here, the time required for the maintenance processing refers to a time from the start of heating by the second heating device 246 to the stop of both the first feed pump P1 and the second heating device 246.

The timing at which the driving of the first feed pump P1 is started may be another timing. For example, the driving of the first supply pump P1 may be started in response to elapse of a time A from the start of the heating by the second heating device 246, or the driving of the first supply pump P1 may be started in response to the temperature indicated by temperature sensor provided in the specific region AR reaching a temperature A.

The temperature A may be the second temperature T2 shown in FIG. 4, or may be more than the first temperature T1 and less than the second temperature T2. The time A may be any predetermined time, and may be set based on, for example, the time required for the temperature of the specific region AR to reach the temperature A.

In the embodiment described above, the timing at which the heating by the second heating device 246 is stopped is the same as the timing at which the driving of the first feed pump P1 is stopped. The timing at which the heating by the second heating device 246 is stopped is not limited thereto. For example, the processor 61 may stop the heating by the second heating device 246 in response to elapse of a predetermined time B from the start of the heating. The time B may be set, for example, based on a time required for the temperature of the specific region AR to reach the second temperature T2 illustrated in FIG. 4, or based on a time required for the second wax component having the highest melting point to start being melted.

Further, when the temperature of the specific area AR is maintained at the second temperature T2 or more even at or after stop of the heating by the second heating device 246, the processor 61 may stop the heating by the second heating device 246 before the driving of the first supply pump P1 is stopped.

That is, the timing at which the heating by the second heating device 246 is stopped is not limited to the timing described above, as long as all the waxes including the second wax having the highest melting point in the specific region AR can be melted by the second heating device 246.

Furthermore, the timing at which the first supply pump P1 is stopped is not limited to the above-described timing, as long as the wax separated in the specific region AR can be caused to flow.

<First Heating Device>

In the present embodiment, the ink is supplied to the first storage tank 243 after the ink is heated to the sol state by the first heating device 242. The first heating device 242, the first storage tank 243, and the second storage tank 244 does not need to be disposed in this order from the main tank 241 as long as the ink heated to the sol state can be supplied to the ink head 245.

For example, the first heating device 242 may be provided in the first storage tank 243 to heat the ink to the sol state in the first storage tank 243. When the ink head unit 24 does not have the first storage tank 243 and the second storage tank 244, the first heating device 242 may be provided in the ink head 245, or the ink may be heated by the first heating device 242 and then supplied to the ink head 245.

<Ink Components>

In the above-described embodiment, the ink contains the plurality of types of waxes having melting points different from each other. Note that in the case of using a naturally derived wax, the wax may contain a plurality of components having different melting points. In such a case, even when the wax included in the ink is of one type, the melting point of part of the components in the wax is high and the melting point of part of the components is low, and the ink components become non-uniform in the same manner as in the case of using the plurality of types of waxes having different melting points.

In the present embodiment, the plurality of types of components having different melting points in the ink are not limited to different types of waxes, and may include components contained in a wax. That is, the ink according to the present embodiment may be an ink containing one type of wax containing components having different melting points.

[Supplementary Note]

The above-described embodiment and modification examples include the following technical ideas.

[Configuration 1]

An image forming apparatus comprising:

a main tank that stores ink containing a plurality of types of components having melting points different from each other;

an ink head unit that includes a first heating device to heat the ink and that ejects the heated ink;

a supply channel that supplies the ink from the main tank to the ink head unit;

a second heating device that heats the supply channel; and a controller, wherein the supply channel includes a specific region having a temperature equal to or more than a first temperature and less than a second temperature when the first heating device is heating the ink and the second heating device is not heating the supply channel, the first temperature being a melting point of a component having a lowest melting point in the plurality of types of components, the second temperature being a melting point of a component having a highest melting point in the plurality of types of components, and the controller causes the second heating device to start heating at a predetermined timing such that the temperature of the specific region is equal to or more than the second temperature.

[Configuration 2]

The image forming apparatus according to configuration 1, wherein the controller causes the second heating device to start the heating in response to establishment of either an event that a power supply of the image forming apparatus is turned on or an event that a first predetermined time or more has elapsed from stop of the heating by the second heating device.

[Configuration 3]

The image forming apparatus according to configuration 1 or 2, wherein the controller causes the second heating device to start the heating when clogging of the ink has occurred.

[Configuration 4]

The image forming apparatus according to configuration 3, further comprising a supply pump that sends the ink from the main tank toward the ink head unit, wherein the ink head unit further includes a storage tank that stores the ink sent by the supply pump, and a sensor that detects a liquid amount of the ink in the storage tank, and the controller causes the second heating device to start the heating when the liquid amount in the storage tank detected by the sensor does not reach a first threshold value within a second predetermined time from driving of the supply pump.

[Configuration 5]

The image forming apparatus according to configuration 3 or 4, further comprising a pressure sensor that detects a pressure of the ink in the supply channel, wherein the controller causes the second heating device to start the heating when a detection value of the pressure sensor reaches a second threshold value.

[Configuration 6]

The image forming apparatus according to any one of configurations 1 to 5, further comprising a supply pump that sends the ink from the main tank toward the ink head unit, wherein the controller drives the supply pump at or after start of the heating by the second heating device and before the temperature of the specific region reaches the second temperature.

[Configuration 7]

The image forming apparatus according to any one of configurations 1 to 6, wherein the controller controls the first heating device to melt the ink to a sol state.

Although embodiments of the present invention have been described and illustrated in detail, the disclosed embodiments are made for purposes of illustration and example only and not limitation. The scope of the present invention should be interpreted by terms of the appended claims.

What is claimed is:

1. An image forming apparatus comprising:

a main tank that stores ink containing a plurality of types of components having melting points different from each other;

an ink head unit that includes a first heating device to heat the ink and that ejects the heated ink;

a supply channel that supplies the ink from the main tank to the ink head unit;

a second heating device that heats the supply channel; and a controller, wherein the supply channel includes a specific region having a temperature equal to or more than a first temperature and less than a second temperature when the first heating device is heating the ink and the second heating device is not heating the supply channel, the first temperature being a melting point of a component having a lowest melting point in the plurality of types of components, the second temperature being a melting point of a component having a highest melting point in the plurality of types of components, and the controller causes the second heating device to start heating at a predetermined timing such that the temperature of the specific region is equal to or more than the second temperature.

2. The image forming apparatus according to claim 1, wherein the controller causes the second heating device to start the heating in response to establishment of either an event that a power supply of the image forming apparatus is turned on or an event that a first predetermined time or more has elapsed from stop of the heating by the second heating device.

3. The image forming apparatus according to claim 1, wherein the controller causes the second heating device to start the heating when clogging of the ink has occurred.

4. The image forming apparatus according to claim 3, further comprising a supply pump that sends the ink from the main tank toward the ink head unit, wherein the ink head unit further includes a storage tank that stores the ink sent by the supply pump, and a sensor that detects a liquid amount of the ink in the storage tank, and the controller causes the second heating device to start the heating when the liquid amount in the storage tank detected by the sensor does not reach a first threshold value within a second predetermined time from driving of the supply pump.

5. The image forming apparatus according to claim 3, further comprising a pressure sensor that detects a pressure of the ink in the supply channel, wherein the controller causes the second heating device to start the heating when a detection value of the pressure sensor reaches a second threshold value.

6. The image forming apparatus according to claim 1, further comprising a supply pump that sends the ink from the main tank toward the ink head unit, wherein the controller drives the supply pump at or after start of the heating by the second heating device and before the temperature of the specific region reaches the second temperature.

7. The image forming apparatus according to claim 1, wherein the controller controls the first heating device to melt the ink to a sol state.

* * * * *